United States Patent
Robertson et al.

(10) Patent No.: US 7,319,860 B2
(45) Date of Patent: Jan. 15, 2008

(54) PSEUDO-INTERACTIVE INPUT PROCESSING IN WIRELESS ENVIRONMENTS

(75) Inventors: Ian M. Robertson, Waterloo (CA); David F. Tapuska, Waterloo (CA)

(73) Assignee: Research In Motion Limited, Waterloo (CA)

(*) Notice: Subject to any disclaimer, the term of this patent is extended or adjusted under 35 U.S.C. 154(b) by 770 days.

(21) Appl. No.: 10/289,657

(22) Filed: Nov. 7, 2002

(65) Prior Publication Data
US 2004/0090465 A1    May 13, 2004

(51) Int. Cl.
*H04Q 7/22*    (2006.01)
(52) U.S. Cl. .............. 455/414.1; 455/466; 455/414.2; 455/414.3; 455/414.4; 455/550.1; 370/412; 370/413; 370/415; 370/417; 710/52; 710/53; 710/56; 709/232; 709/235; 709/246; 709/247
(58) Field of Classification Search ............ 455/414.1, 455/412.1, 466, 574, 566, 414.2, 414.3, 414.4, 455/550.1; 370/477, 412, 465, 468, 470, 370/472, 519, 413, 414, 415, 416; 345/169, 345/541, 542, 543, 551, 23, 141, 467, 468, 345/469, 470, 471, 472, 545, 559; 711/153, 711/170, 171, 172, 173; 710/52, 53, 56; 709/232, 235, 246, 247
See application file for complete search history.

(56) References Cited

U.S. PATENT DOCUMENTS

| | | | |
|---|---|---|---|
| 4,665,519 A | | 5/1987 | Kirchner et al. ............... 370/94 |
| 5,056,088 A | | 10/1991 | Price et al. ................. 370/94.1 |
| 5,412,780 A | * | 5/1995 | Rushton .................... 711/113 |
| 5,566,208 A | * | 10/1996 | Balakrishnan .............. 375/240 |
| 5,812,651 A | * | 9/1998 | Kaplan ...................... 379/200 |
| 5,892,980 A | * | 4/1999 | Tal et al. .................... 710/56 |
| 5,991,633 A | * | 11/1999 | Corriveau et al. .......... 455/466 |
| 6,085,254 A | * | 7/2000 | Kotsinas et al. ............ 709/235 |

(Continued)

FOREIGN PATENT DOCUMENTS

EP      0396309      11/1990

(Continued)

OTHER PUBLICATIONS

CCITT The International Telegraph and Telephone Consultative Committee Recommendation X.28—DTE/DCE Interface for a Start-Stop Mode Data Terminal Equipment Accessing the Packet Assembly/Disassembly Facility (PAD) in a Public Data Network Situated in the Same Country Nov. 14, 1988 Melbourne, AU see paragragh 4.4.

Primary Examiner—Rafael Perez-Gutierrez
Assistant Examiner—Olumide Ajibade-Akonai
(74) Attorney, Agent, or Firm—Jones Day; Krishna K. Pathiyal; Robert C. Liang

(57) ABSTRACT

An electronic communications device including a user input device for inputting characters; and buffering and communications systems for storing in a buffer characters input by the user input device, and transmitting the content of the buffer over a communications link when there is a pause in input by the user input device for a predetermined time duration. The content of the buffer may also be transmitted over the communications link when the amount of stored characters in the buffer reaches a predetermined size, or when a designated submit key is detected.

16 Claims, 3 Drawing Sheets

U.S. PATENT DOCUMENTS

| | | | | |
|---|---|---|---|---|
| 6,105,070 | A * | 8/2000 | Gaylord | 709/232 |
| 6,597,918 | B1 * | 7/2003 | Kim | 455/466 |
| 6,654,619 | B1 * | 11/2003 | Zicker et al. | 455/564 |
| 7,231,340 | B2 * | 6/2007 | Burchard et al. | 713/300 |
| 2002/0004381 | A1 * | 1/2002 | Theimer | 455/412 |
| 2002/0058522 | A1 * | 5/2002 | Kim et al. | 455/466 |
| 2002/0080239 | A1 | 6/2002 | Ikeda et al. | |
| 2003/0061448 | A1 * | 3/2003 | Rawson | 711/133 |
| 2004/0018849 | A1 * | 1/2004 | Schiff | 455/522 |
| 2004/0203606 | A1 * | 10/2004 | Souissi et al. | 455/412.1 |

FOREIGN PATENT DOCUMENTS

| | | |
|---|---|---|
| WO | WO 99/65212 | 12/1999 |
| WO | WO 200064733 A1 * | 11/2000 |

* cited by examiner

PSEUDO-INTERACTIVE INPUT PROCESSING IN WIRELESS ENVIRONMENTS

BACKGROUND OF THE INVENTION

The present invention relates to wireless communications, and more particularly to input processing in the wireless environment.

Wireless communications systems generally involve a plurality of mobile units that send data to and receive data from stationary base stations. Such communications are typically packet based, with each sent packet containing payload data, error detection and correction data, and overhead data such as information identifying the packet source and destination. In bi-directional packet based communications systems, the device receiving a sent packet will often respond by transmitting an acknowledgment so that the sending device can confirm transmission.

Wireless e-mail and text messaging are growing in popularity. E-mail tends not to be very interactive in that an entire message, often several sentences long, is transmitted in one transmission to a destination where it waits to be retrieved by the recipient. Text messaging systems tend to be more interactive, with typically short messages being exchanged between two or more devices in close to real time. In some text messaging systems, input text is buffered and then sent as soon as a carriage return or other designated submit key is pressed. Some messaging systems are fully interactive in that each character is transmitted as soon as it is entered (for example a telnet session). Both buffered line and fully interactive systems can have shortcomings in high latency environments. In buffered line systems, the transmitted block size tends to be large, resulting in delays while the mobile transmitting unit waits for the transmission to be received, processed and acknowledged by the base station. Fully interactive character-by-character transmission systems use smaller transmission packets, but each packet includes overhead and requires a transmitted acknowledgement from the base station for each character, which can be resource inefficient and also result in perceived delays at the mobile unit.

Accordingly, an input processing and transmission system that can provide improved performance in a high latency wireless channel is desired.

SUMMARY OF THE INVENTION

According to one aspect of the invention, there is provided an electronic communications device including a user input device for inputting characters; and buffering and communications systems for storing in a buffer characters input by the user input device, and transmitting the content of the buffer over a communications link when there is a pause in input by the user input device for a predetermined time duration. Preferably, the content of the buffer is also transmitted over the communications link when the amount of stored characters in the buffer reaches a predetermined size and the content of the buffer is also transmitted over the communications link when a predetermined input is made by the user input device According to another aspect of the invention, there is provided a method for transmitting information over a communications link from a communications device having a user input device, comprising (a) storing characters input by the user input device in a buffer; (b) determining if a threshold time has passed since a last character was input by the user input device and if so: (i) transmitting the stored characters over the communications link and (ii) clearing the buffer.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein.

DETAILED DESCRIPTION

Figure 1:
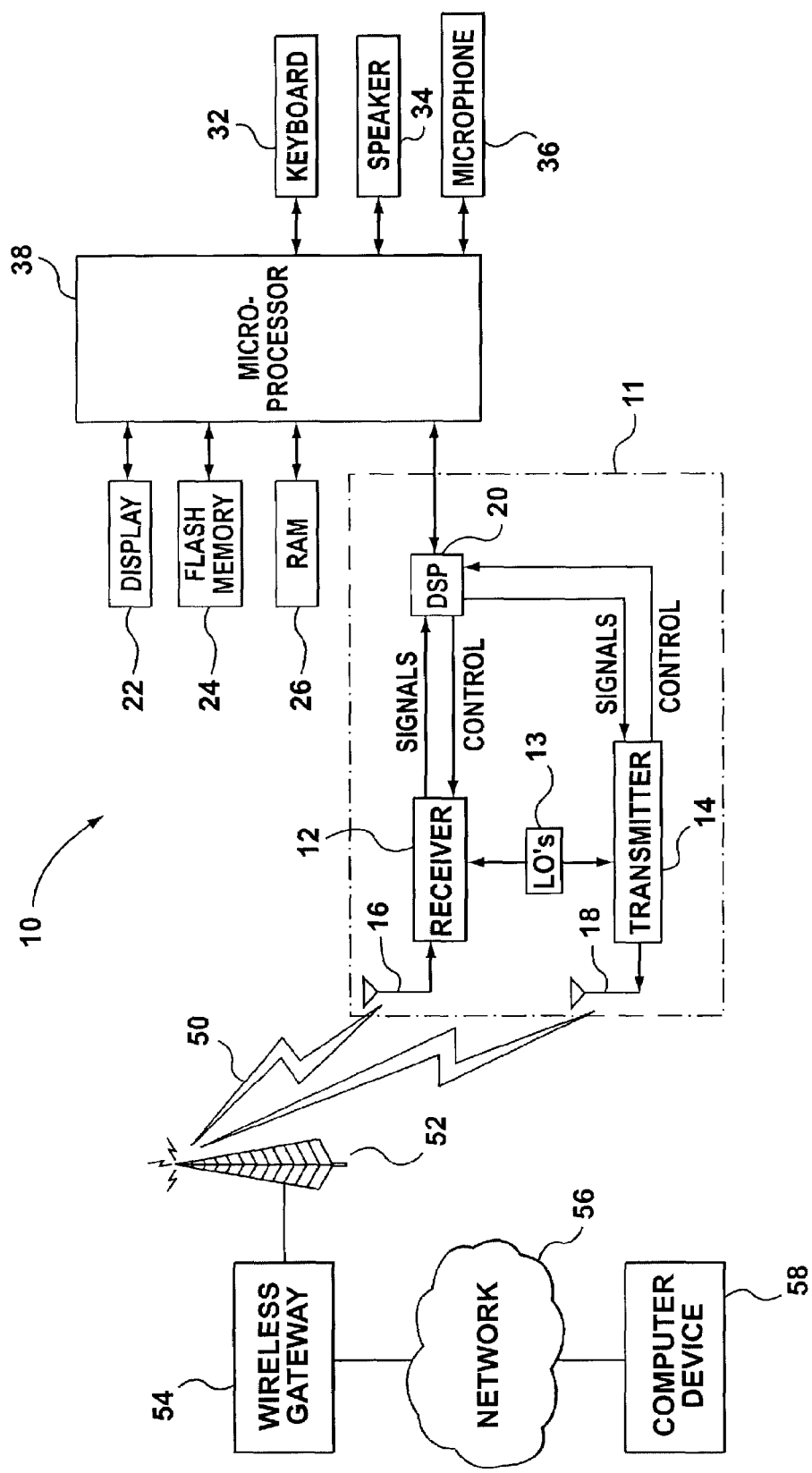
FIG. 1 is a block diagram showing a communications system including a mobile communications device to which the present invention may be applied.

Referring to the drawings, FIG. 1 is a block diagram of an exemplary communications system including a mobile communications device 10 to which the present invention may be applied. The mobile communications device 10 communicates via a wireless link 50, a wireless gateway 54 and a network 56 with a further computer device 58. The wireless link 50 may be a high latency link, and may include a cellular network, an RF wireless network, a satellite network, or other type of network. The wireless gateway 54 is connected to the network 56 to communicate through one or more antennas 52 with a plurality of mobile devices, including mobile communications device 10. The network 56 provides a communications link between the computer device 58 and the wireless gateway 54 and may include, among other things, wired or wireless links, the Internet, one or more intranets, routers, servers, firewalls and various combinations of the forgoing. Computer device 58 may be, among other things, a conventional desktop personal computer or laptop or could be a mobile computing device substantially identical to mobile communications device 10.

The mobile communication device 10 is a two-way communication device having at least data communication capabilities and incorporates a communication subsystem 11 for communicating via wireless link 50. The communication subsystem includes a receiver 12, a transmitter 14, and associated components such as one or more antenna elements 16 and 18, local oscillators (LOs) 13, and a processing module such as a digital signal processor (DSP) 20. As will be apparent to those skilled in the field of communications, the particular design of the communication subsystem 11 will be dependent upon the communication network in which the device is intended to operate.

Signals received by the antenna 16 through wireless link 50 are input to the receiver 12, which may perform such common receiver functions as signal amplification, frequency down conversion, filtering, channel selection, and analog to digital conversion. Demodulation and decoding of received signals is performed in a DSP 20. In a similar manner, signals to be transmitted are processed, including modulation and encoding for example, by the DSP 20 and input to the transmitter 14 for digital to analog conversion, frequency up conversion, filtering, amplification and transmission over the wireless link 50 via the antenna 18. The DSP 20 not only processes communication signals, but also provides for receiver and transmitter control. For example, the gains applied to communication signals in the receiver 12 and transmitter 14 may be adaptively controlled through automatic gain control algorithms implemented in the DSP 20.

The device 10 preferably includes a microprocessor 38 that controls the overall operation of the device. Communication functions, including at least data communications, are performed through the communication subsystem 11. The microprocessor 38 also interacts with further device subsystems such as a display 22, flash memory 24, random access memory (RAM) 26, keyboard 32, speaker 34, and possibly a microphone 36.

Operating system software used by the microprocessor 38 is preferably stored in a persistent store such as flash memory 24, which may instead be a read only memory (ROM) or similar storage element. Those skilled in the art will appreciate that the operating system, specific device applications, or parts thereof, may be temporarily loaded into a volatile store such as RAM 26. It is contemplated that received communication signals may also be stored to RAM 26.

The microprocessor 38, in addition to its operating system functions, preferably enables execution of software applications on the device. A predetermined set of applications which control basic device operations, including at least data communication applications for example, will normally be installed on the device 10 during manufacture. Further applications may also be loaded onto the device 10 and installed by a user in the RAM 26 or preferably a non-volatile store (not shown) for execution by the microprocessor 38.

In a data communication mode, a received signal such as a text message or web page download will be processed by the communication subsystem 11 and input to the microprocessor 38, which may further process the received signal for output to the display 22. A user of device 10 may also compose data items such as email and text messages for example, using the keyboard 32. Such composed items may then be transmitted over a communication network through the communication subsystem 11.

Figure 2:
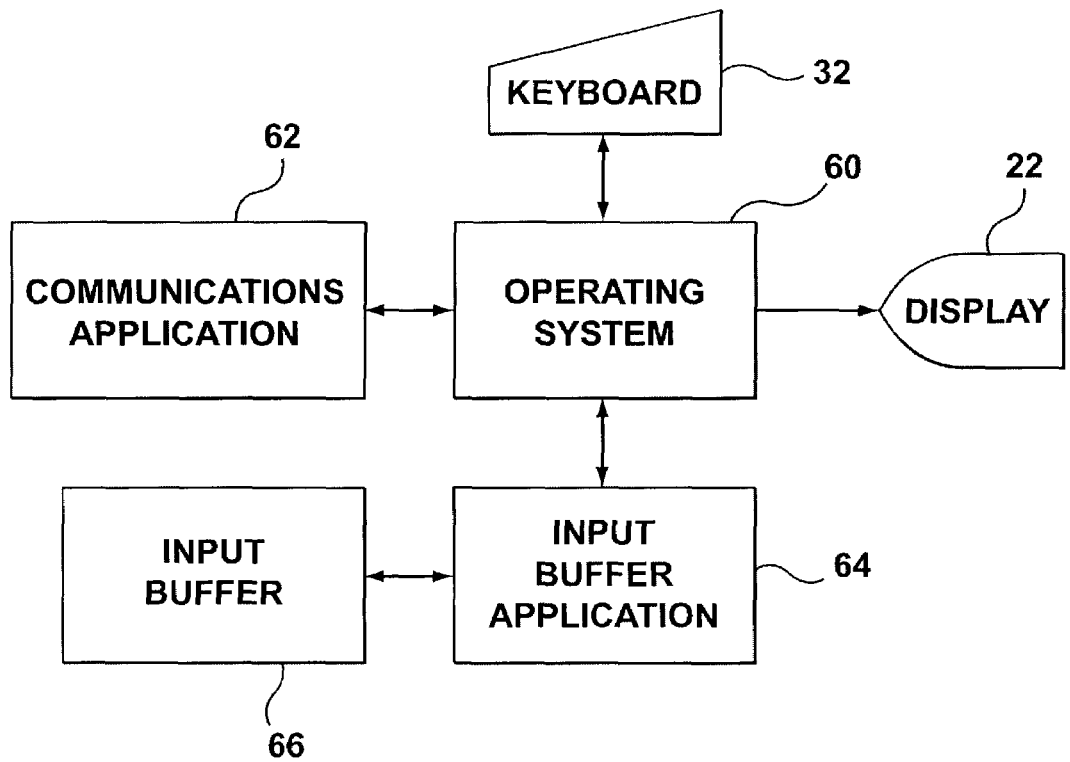
FIG. 2 is a general block diagram of the major software subsystems implemented on a microprocessor of the mobile communication device of FIG. 1.

FIG. 2 shows some of the systems implemented by software running on microprocessor 38, including the operating system 60 and various specialized applications including a communications application 62 and an input buffer application 64. The operating system coordinates operation of the specialized applications and communications with the various I/O systems such as the keyboard 32 and display 22. In one embodiment, the operating system 60 passes information received from the keyboard 32 to the input buffer application 64 and receives information from the input buffer application 64 for the communications application 62. Communications application 62 may be a conventional application that acts as an interface between microprocessor 38 and the communications subsystem 11.

Figure 3:
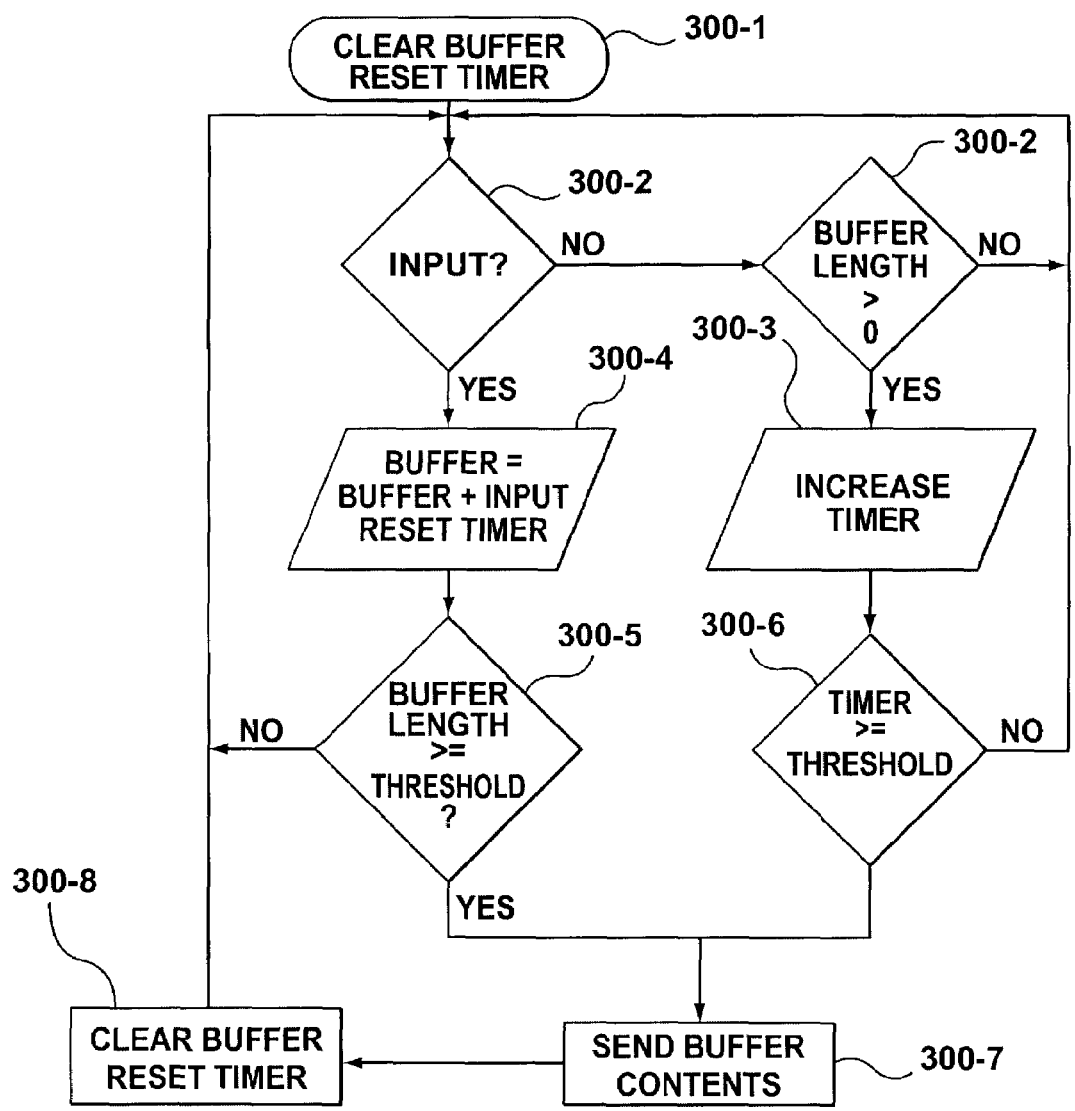
FIG. 3 is a flow chart showing text processing by the mobile communications device according to embodiments of the present invention.

The present invention relates primarily to a data communication mode of the device 10, and in particular to a text messaging mode of the device, and in this regard FIG. 3 shows a block diagram of peusdo-interactive input processing performed by the device 10 according to embodiments of the invention. In the illustrated embodiment, the user of device 10 uses keyboard 32 to enter a message that includes a plurality of characters, and the message is transmitted over communications link 50 and ultimately to a receiving computer device 58. The keyboard 32 may be a conventional alphanumeric keyboard, for example a QWERTY keyboard made up of a plurality of depressible keys or pads each associated with one or more alphanumeric characters. Although the present description refers to a keyboard as the preferred input device, other types of character or symbol input devices could be used in place of or in addition to a keyboard for user input of characters to the device 10, for example a stylus activated on-screen virtual keyboard.

According to one embodiment of the invention, the input buffer application 64 is configured to store characters input by a user into a input buffer 66 (FIG. 2) until either user input pauses for a threshold time or a threshold number of characters have been stored, after which the contents of the input buffer 66 are passed to the communications application 62 and sent over the wireless link 50. When entering a text-messaging mode, the input buffer application 64 performs an initialization step causing the input buffer 66 and an input pause timer to be respectively cleared and set to zero (step 300-1, FIG. 3). The input buffer application 64 then checks to see if a symbol or character has been inputted through keyboard 32 (step 300-2).

If a keyboard input is detected, the input character is added to the input buffer 66 and the input pause timer is reset (step 300-4). Using techniques well known in the art, the input character will also be added to a display buffer and displayed on the display screen 22, providing the user of the device 10 with visual feedback as to what characters have been input. After adding the character to the input buffer and resetting the timer, the input buffer application checks to see if the buffer length has reached a predetermined threshold, for example 150 characters (step 300-5). If the threshold buffer length has not been reached, the input buffer application 64 returns to step 300-2 to check for the next inputted character.

If in step 300-2 a determination is made that a user input has not occurred, a check is performed to see if any characters are currently stored in the input buffer 66 (step 300-2), and if the input buffer is empty the buffer application 32 immediately returns to step 300-2 to check again for input of a character. In the event that the input buffer 66 is not empty in step 300-2, the input pause timer is incremented (step 300-3). Whenever the input pause timer is incremented, the input buffer application 64 checks to determine if the input pause timer has reached or exceeded a predetermined threshold pause time, for example, one second (as measured since the time that the last character was added to the input buffer 66) (step 300-6). If in step 300-6 the input pause timer has not reached the threshold pause time, then the input buffer application 64 returns to step 300-2 to check for input of another character.

If either the input buffer length threshold is reached (step 300-5) or the input pause time threshold reached (step 330-6), then the input buffer application 64 causes the contents of the input buffer 66 to be passed on to the communications application 62 (step 300-7), which packages the character(s) that were contained in the input buffer as required for sending out by the communications subsystem 11 over the communications link 50. The input buffer application 64 then clears the content of the input buffer 66 and resets the input pause timer (step 300-8) and returns to step 300-2 to check for the next inputted character.

In some embodiments, different events in addition to reaching a threshold buffer length or threshold input pause time could be used to trigger sending of the input buffer 66.

Figure 4:
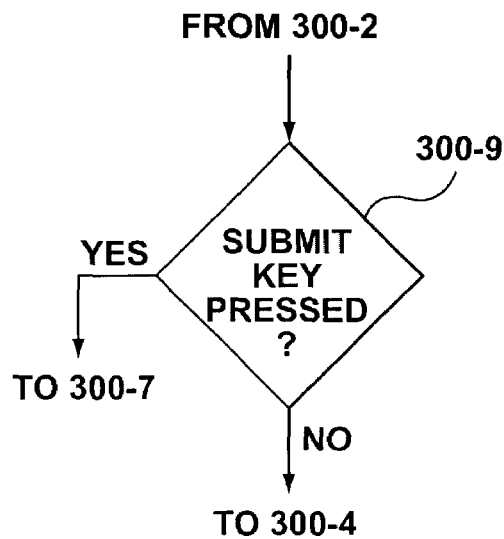
FIG. 4 shows a further text processing step according to a further embodiment of the invention.

By way of example, the device 10 may be configured to permit the user to force sending of the input buffer, and in this regard FIG. 4 shows an additional process step 300-9 that could be inserted between steps 300-2 and 300-4. In step 300-9, once an input is entered, the input buffer application 64 checks to see if the input corresponds to a predetermined submit input (such as a carriage return or an "alt key-space key" combination for example). If so, the input buffer application immediately proceeds to step 300-7 to send the buffer contents, and if not, continues to step 300-4.

It will thus be appreciated that the message to be transmitted from device 10 is broken up and transmitted as discrete characters or strings of characters. The microprocessor is configured to transmit the contents of the input buffer when a) a predetermined duration of time has passed since the last user input was entered into the buffer 66, or b) the number of characters stored in the buffer 66 reaches a predetermined size; or c) in the embodiment of FIG. 4, the user triggers a transmission by pressing a predetermined submit key or key combination. Once the content of the input buffer is transmitted, the buffer is cleared, the timer reset and the process starts again. In the event that the user inputs data without pausing, the message will be sent as groups of characters that are no larger than the buffer threshold, and in the case of slow input entry with pauses between character inputs, the message will be sent as even smaller groups of characters or as individual characters.

The present invention allows the device 10 to take advantage of pauses that occur during keystroke entry and transmit data when such pauses occur, which can help to alleviate perceived slow downs in device operation that can occur when data is transmitted character by character or in large blocks in a high latency channel. Input characters will typically be transmitted in groups, and so the transmission overhead associated with each character is reduced when compared to fully interactive systems in which characters are transmitted one at a time. On the other hand, the use of an input pause time threshold for triggering transmission permits relatively small blocks of data to be transmitted when pauses in user input occur. The additional use of a threshold buffer size as a further transmission trigger ensured that transmitted block size always stays within a predetermined level. Thus, the present invention offers a solution that may be advantageous for use in high latency channels. The process carried out by the input buffer application 64 should generally be imperceptible to the user entering the text message. Although described in the context of a wireless device, the present invention could also be used in conjunction with a wired communications link. The present invention could be used with either fixed packet or variable packet size transmission protocols. In fixed packet systems, the buffer threshold may be set to the packet payload size.

The buffer length and input pause time thresholds may be permanently set values or may, in some embodiments, be user adjustable such that the thresholds can be configured according to a specific user's preferences. A pause time threshold of approximately one second may be appropriate in some GPRS networks, with other pause times being more effective in other networks. In some embodiments, the device 10 could be configured to dynamically adjust the input buffer threshold length and the input pause time threshold in order to maximize performance based on, among other things, a) the packet size and packet overhead of the communications network in which the device is used; b) the latency and bandwidth of the network; c) the user's typing speed; and/or d) the processing resources available on the device.

In some applications, the microprocessor could be configured to disregard buffer length when determining if the input buffer content should be transmitted. In such a system, the input buffer content would be transmitted when a user input pause of a predetermined duration had occurred, or if the user pressed a designated submit key or key combination.

The above-described embodiments of the present invention are intended to be examples only. Alterations, modifications and variations may be effected to the particular embodiments by those skilled in the art without departing from the scope of the invention, which is defined by the claims appended hereto.

We claim:

1. An electronic communications device comprising:
   a user input device for inputting characters; and
   buffering and communications systems for storing buffer characters input by the user input device, and transmitting the content of the buffer over a communications link when there is a pause in input by the user input device for a predetermined time duration;
   wherein the buffer has a buffer threshold length;
   wherein the electronic device is configured to dynamically adjust the buffer threshold length or the predetermined time duration based on a user's typing speed.

2. The electronic communications device of claim 1 wherein the content of the buffer is cleared each time the content of the buffer is transmitted.

3. The electronic communications device of claim 1 wherein the content of the buffer is also transmitted over the communications link when the amount of stored characters in the buffer reaches a predetermined size.

4. The electronic communications device of claim 1 wherein the content of the buffer is also transmitted over the communications link when a predetermined submit input is received from the user input device.

5. The electronic communications device of claim 1 wherein the content of the buffer is also transmitted over the communications link when the amount of stored characters in the buffer reaches a predetermined size and the content of the buffer is also transmitted over the communications link when a predetermined input is made by the user input device.

6. The electronic communications device of claim 1 wherein the predetermined time duration is approximately one second.

7. The electronic communications device of claim 1 wherein the communications link includes a wireless link.

8. The electronic communications device of claim 1 wherein the user input device includes a keyboard.

9. The electronic communications device of claim 1, where the electronic device is further configured to dynamically adjust the buffer threshold length or the predetermined time duration based on at least one or a packet size and packet overhead of a particular communications network in which the device is used, a latency and bandwidth of the network, and processing resources available on the device.

10. A method for transmitting information over a communications link from a communications device having a user input device, comprising:
   storing characters input by the user input device in a buffer, the buffer having a buffer threshold length;

dynamically adjusting the buffer threshold length or a threshold time since a last character was input based on a user's typing speed; and determining if the threshold time has passed since the last character was input by the user input device, and if so transmitting the stored characters over the communications link and clearing the buffer.

11. The method of claim 10 wherein the threshold time is approximately one second.

12. The method of claim 10 including a step of determining if a threshold number of characters have been stored in the buffer and if so: (i) transmitting the stored characters over the communications link and (ii) clearing the buffer.

13. The method of claim 10 including a step of determining if a predetermined send command has been input by the user input device and if so: (i) transmitting the stored characters over the communications link and (ii) clearing the buffer.

14. The method of claim 10 including a step of determining if either a threshold number of characters have been stored in the buffer or a predetermined send command has been input by the user input device, and if so: (i) transmitting the stored characters over the communications link and (ii) clearing the buffer.

15. The method of claim 10 wherein the user input device includes an alphanumeric keyboard.

16. The method of claim 10 wherein the communications link includes a high latency wireless channel.

* * * * *